US007929506B1

(12) United States Patent
Manning et al.

(10) Patent No.: US 7,929,506 B1
(45) Date of Patent: Apr. 19, 2011

(54) METHOD OF RESOURCE MANAGEMENT FOR A MOBILE NODE

(75) Inventors: Serge M. Manning, Overland Park, KS (US); Mark A. Lipford, Leawood, KS (US); Charles Brent Hirschman, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1315 days.

(21) Appl. No.: 11/481,102

(22) Filed: Jul. 5, 2006

(51) Int. Cl.
*H04W 4/00* (2009.01)

(52) U.S. Cl. .................. 370/338; 455/432.1; 455/432.2; 455/433; 455/435.1; 455/436; 370/310.2; 370/328; 370/329; 370/351; 370/395.54; 370/431; 709/203; 709/226; 709/228; 709/229; 709/250

(58) Field of Classification Search .................. 370/328, 370/329, 338, 352, 431, 331, 310.2, 351, 370/395.53, 395.54; 455/450, 451, 452.1, 455/452.2, 436–444, 432.1, 432.2, 433, 437, 455/438, 439, 440; 709/223, 226, 227, 228, 709/229, 202, 203, 224, 225, 250
See application file for complete search history.

(56) References Cited

U.S. PATENT DOCUMENTS

| | | | | | |
|---|---|---|---|---|---|
| 5,572,528 | A | * | 11/1996 | Shuen ............................ | 370/402 |
| 6,434,134 | B1 | * | 8/2002 | La Porta et al. ................ | 370/338 |
| 6,636,498 | B1 | * | 10/2003 | Leung ............................ | 370/338 |
| 6,795,857 | B1 | * | 9/2004 | Leung et al. ................... | 709/224 |
| 6,907,016 | B2 | * | 6/2005 | Madour et al. ................ | 370/331 |
| 6,959,341 | B1 | * | 10/2005 | Leung ............................ | 709/250 |
| 7,061,887 | B2 | * | 6/2006 | Fan ................................ | 370/331 |
| 7,471,634 | B1 | * | 12/2008 | Wenzel et al. ................. | 370/241 |
| 7,496,057 | B2 | * | 2/2009 | Patel et al. ..................... | 370/310 |
| 7,668,174 | B1 | * | 2/2010 | Patel et al. .................. | 370/395.3 |
| 2002/0009066 | A1 | * | 1/2002 | Shimizu et al. ............... | 370/338 |
| 2004/0022212 | A1 | * | 2/2004 | Chowdhury et al. .......... | 370/329 |
| 2005/0169249 | A1 | | 8/2005 | Shirota et al. | |
| 2005/0237983 | A1 | * | 10/2005 | Khalil et al. ................... | 370/338 |
| 2006/0083238 | A1 | * | 4/2006 | Lee et al. ....................... | 370/389 |
| 2007/0025305 | A1 | * | 2/2007 | Denny et al. ................... | 370/338 |
| 2007/0291717 | A1 | * | 12/2007 | Williams et al. ............... | 370/338 |

OTHER PUBLICATIONS

C. Rigney, et al., Network Working Group, "*Remote Authentication Dial In User Services (RADIUS)*", Request for Comments 2865, Jun. 2000.
C. Rigney, et al, Network Working Group, "*RADIUS Accounting,*" Request for Comments 2866, Jun. 2000.
C. Perkins, Network Working Group, "*IP Mobility Support for IPv4,*" Request for Comments 3344 Aug. 2002.
S. Glass, et al., Network Working Group, "Registration Revocation in Mobile IPv4," Request for Comments 3543 Aug. 2003.

(Continued)

*Primary Examiner* — Charles N Appiah
*Assistant Examiner* — Olumide T Ajibade-Akonai

(57) ABSTRACT

A mobile node using Mobile IP is served by a network access server (NAS), wherein the NAS has allocated a care-of address for the mobile node and a home agent has a mobility binding that associates the care-of address with the mobile node's home address. When the mobile node's care-of address is no longer valid, an intermediary server receives a notification messages from a first network element (e.g., the NAS or home agent) and sends a resource management message to a second network element (e.g., the home agent or NAS). In response to the resource management message, the second network element clears at least one resource associated with the mobile node. For example, the NAS may de-allocate the care-of address and the home agent may clear the mobility binding.

9 Claims, 4 Drawing Sheets

OTHER PUBLICATIONS

M. Chiba, et al., Network Working Group, "*Dynamic Authorization Extensions to Remote Authentication dial in User Service (RADIUS)*," Request for Comments 3576, Jul. 2003.

D. Johnson, et al., Network Working Group, "*Mobility Support in IPv6*," Request for Comments 3775, Jun. 2004.

G. Zorn, et al., Network Working Group, "*User Session Tracking in RADIUS,*" Internet Draft, Mar. 5, 2006.

K. Chowdhury, et al., Network Working Group, "*RADIUS Mobile IPv6 Support,*" Internet Draft, Mar. 6, 2006.

\* cited by examiner

| Attribute Type | Attribute Length | Vendor-ID | |
|---|---|---|---|
| Vendor-ID (cont'd) | | Vendor-Type | Vendor-Length |
| Sub-Type ID (=1) | Sub-Type Length | Care-of Address | |
| Care-of Address (cont'd) | | | |
| Care-of Address (cont'd) | | | |
| Care-of Address (cont'd) | | | |
| Care-of Address (cont'd) | | Sub-Type ID (=2) | Sub-Type Length |
| Correlation ID | | | |
| Correlation ID (cont'd) | | | |

FIG. 4

| Attribute Type | Attribute Length | Vendor-ID | |
|---|---|---|---|
| Vendor-ID (cont'd) | | Vendor-Type | Vendor-Length |
| Sub-Type ID (=1) | Sub-Type Length | New Care-of Address | |
| New Care-of Address (cont'd) | | | |
| New Care-of Address (cont'd) | | | |
| New Care-of Address (cont'd) | | | |
| New Care-of Address (cont'd) | | Sub-Type ID (=2) | Sub-Type Length |
| Correlation ID | | | |
| Correlation ID (cont'd) | | | |
| Sub-Type ID (=3) | Sub-Type Length | Prior Care-of Address | |
| Prior Care-of Address (cont'd) | | | |
| Prior Care-of Address (cont'd) | | | |
| Prior Care-of Address (cont'd) | | | |
| Prior Care-of Address (cont'd) | | | |

FIG. 5

METHOD OF RESOURCE MANAGEMENT FOR A MOBILE NODE

BACKGROUND

1. Field of the Invention

The present invention relates to telecommunications and, more particularly, to a method of resource management for a mobile node, e.g., for a mobile node using Mobile IPv6.

2. Description of Related Art

Mobile IP has been used to allow mobile nodes to remain reachable when they move around in an Internet Protocol (IP) network. Mobile IP for IPv4 (MIPv4) is described in C. Perkins, "IP Mobility Support for IPv4," Request for Comments 3344, August 2002, which is incorporated herein by reference. Mobile IP for IPv6 (MIPv6) is described in D. Johnson et al., "Mobility Support in IPv6," Request for Comments 3775, June 2004, which is incorporated herein by reference.

In the Mobile IP approach, a mobile node is assigned a home address that routes to a home agent. When the mobile node is away from its home network (i.e., roaming), the mobile node registers a care-of address with the home agent, and the home agent maintains a mobility binding for the mobile node that associates the mobile node's home address with the mobile node's care-of address. Then, when the home agent receives packets addressed to the mobile node's home address, the home agent forwards the packets to the mobile node's care-of address. In this way, the mobile node can remain reachable at its home address even when its point of attachment to the IP network changes.

However, supporting Mobile IP consumes network resources. For example, a network element, such as a network access server (NAS) would typically allocate a care-of address to each roaming mobile node that the NAS is serving and a home agent would typically maintain a mobility binding for each roaming mobile node that the home agent is serving. When a mobile node stops using a given care-of address, the network resources associated with the care-of address may be freed up. For example, a NAS may de-allocate the mobile node's care-of address, so that it can be allocated to a different mobile node, and the home agent may be able to clear the mobile node's mobility binding (unless the mobile node obtains a new care-of address). Such resources are often associated with designated "lifetimes," so that the resources can be cleared automatically when the lifetime expires. However, it is often beneficial to clear unneeded resources more quickly because "dangling" resources can create a significant impact on a network in terms of capacity and operational costs.

Accordingly, there is a need for methods of managing resources for a mobile node in a timely manner.

SUMMARY

In a first principal aspect, an exemplary embodiment of the present invention provides a method of resource management for a mobile node that has been allocated a care-of address. In accordance with the method, an intermediary server receives a first message from a first network element. The first message indicates that the care-of address is no longer valid for the mobile node. In response to the first message, the intermediary server sends a second message to a second network element. The second message indicates that the care-of address is no longer valid for the mobile node. In response to the second message, the second network element clears at least one resource associated with the mobile node.

In a second principal aspect, an exemplary embodiment of the present invention provides a method of resource management for a mobile node. The mobile node has been allocated a care-of address by a network access server (NAS) serving the mobile node via a radio access network (RAN). A home agent has a mobility binding that associates a home address of the mobile node with the care-of address. In accordance with the method, the RAN makes a determination that connectivity with the mobile node has been lost. In response to the determination, the NAS sends a notification message to an intermediary server. The notification message indicates that the care-of address is no longer valid for the mobile node. In response to the notification message, the intermediary server sends a resource management message to the home agent. The resource management message indicates that the care-of address is no longer valid for the mobile node. In response to the resource management message, the home agent clears the mobility binding.

In a third principal aspect, an exemplary embodiment of the present invention provides a method of resource management for a mobile node. The mobile node has been allocated a care-of address by a network access server (NAS), and a home agent has a mobility binding that associates a home address of the mobile node with the care-of address. In accordance with the method, the home agent receives a binding update message from the mobile node. The binding update message indicates a new care-of address for the mobile node. In response to the binding update message, the home agent sends a notification message to an intermediary server. The notification message indicates that the care-of address is no longer valid for the mobile node. In response to the notification message, the intermediary server sends a resource management message to the NAS. The resource management message indicates that the care-of address is no longer valid for the mobile node. In response to the second resource management message, the NAS de-allocates the care-of address.

BRIEF DESCRIPTION OF THE DRAWINGS

FIG. 4 is a schematic diagram illustrating an "Invalid-CoA" Vendor Specific Attribute, in accordance with an exemplary embodiment of the present invention; and FIG. 5 is a schematic diagram illustrating an "Update-CoA" Vendor Specific Attribute, in accordance with an exemplary embodiment of the present invention.

DETAILED DESCRIPTION OF EXEMPLARY EMBODIMENTS

1. Overview

Figure 1:
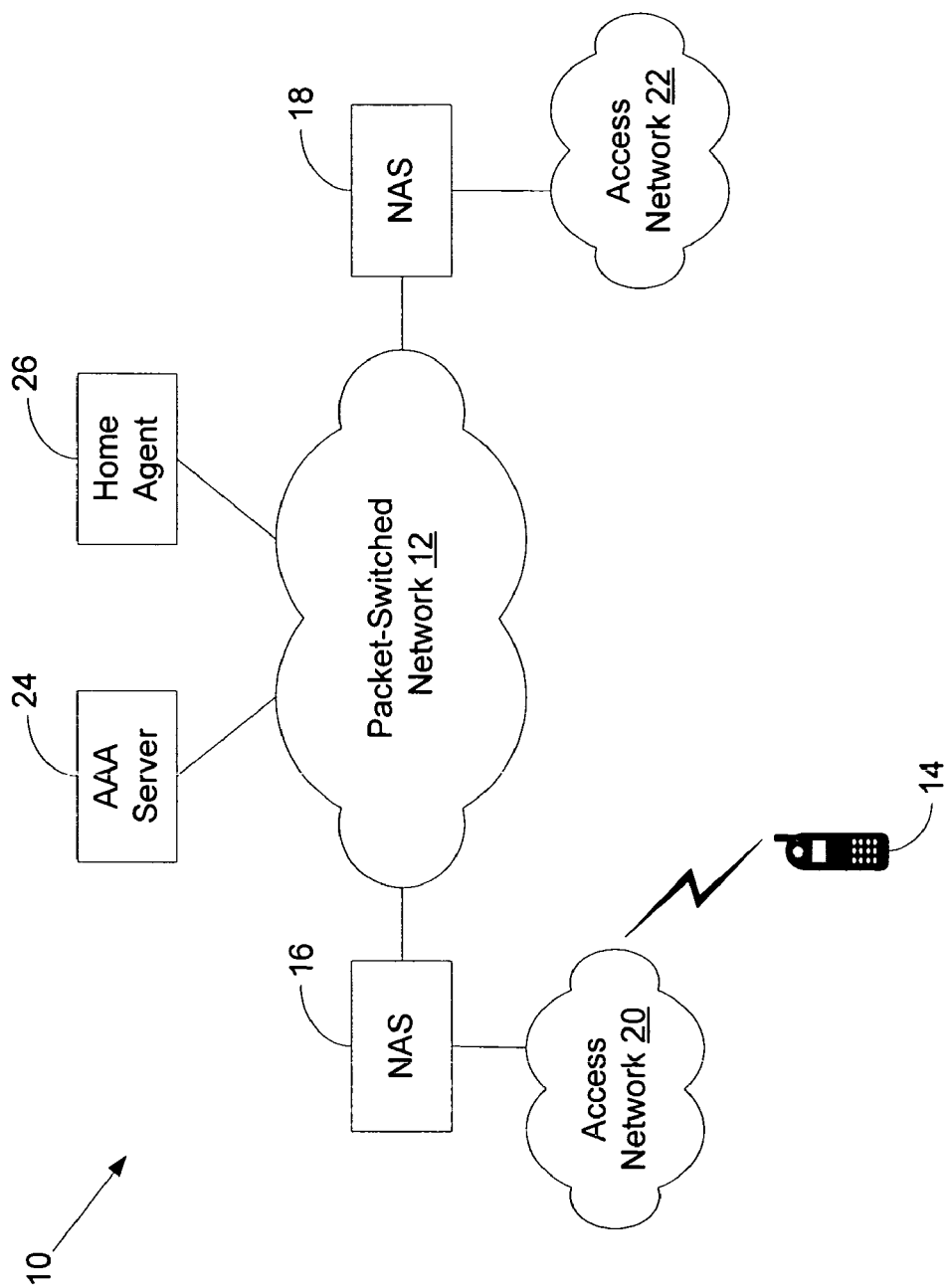
FIG. 1 is a block diagram of a telecommunications network, in accordance with an exemplary embodiment of the present invention.

The present invention, in its exemplary embodiments, provides methods of resource management for a mobile node. Resource management may come into play when a mobile node changes its network status in some way, such that one or more resources associated with the mobile node are no longer needed. Such resources may include, for example, one or more addresses allocated to the mobile node, mobility bindings, registrations, buffers, state information, or any other data or capability that was used to support the mobile node's prior network status. When the change in network status occurs, it may be beneficial to clear the resources so that they are not left "dangling."

For example, a mobile node may be allocated a care-of address for Mobile IP. The care-of address could be an IPv6 address for MIPv6. At some point the care-of address mobile node may no longer be valid for the mobile node, for example, because the mobile node has disconnected from the network or has obtained a new care-of address. Resource management messages may then be sent to one or more network elements that have resources that can be cleared, given the mobile node's change in status. In one example, a network access server (NAS) that allocated the care-of address to the mobile node may receive a resource management message and may responsively de-allocate the care-of address. In another example, a home agent that maintains a mobility binding for the mobile node (i.e., associating the care-of address with the mobile node's home address) may receive a resource management message and may responsively clear the mobility binding.

In an exemplary embodiment, the resource management messages may be sent by an intermediary server. The intermediary server could be, for example, the mobile node's home authentication, authorization, and accounting (AAA) server. The intermediary server may send resource management messages in response to receiving notification messages from network elements that become aware of the mobile node's change in status.

In one example, a mobile node may be served by a NAS via an access network. At some point, the access network may determine that connectivity with the mobile node has been lost. In response, the NAS may send a notification message to the intermediary server indicating that the mobile node's care-of address is no longer valid. The intermediary server may then send a resource management message to the mobile node's home agent indicating that the mobile node's care-of address is no longer valid, and the home agent may responsively clear the mobile node's mobility binding.

In another example, a mobile node with a prior care-of address allocated by a prior NAS may be handed off to a new NAS that allocates a new care-of address for the mobile node. The mobile node may register the new care-of address with the home agent (e.g., in a MIPv6 Binding Update message). In response, the home agent may then send a notification message to the intermediary server indicating that the mobile node's care-of address is no longer valid. The intermediary server may then send a resource management message to the prior NAS indicating that the mobile node's care-of address is no longer valid, and the prior NAS may responsively de-allocate the care-of address.

This resource management method may be particularly useful when the mobile node uses MIPv6. However, the resource management method could also be used when the mobile node uses MIPv4, or in other situations when the mobile node is able to change its point of network attachment.

2. Exemplary Network Architecture

FIG. 1 is a block diagram of a telecommunications network 10, in which exemplary embodiments of the present invention may be employed. Network 10 may include a packet-switched network 12, which can be accessed by mobile nodes, such as mobile node 14, in order to send or receive voice, video, data, or other media. Packet-switched network 12 routes packets based on network addresses, for example, using the Internet Protocol. The network addresses may include IPv6 addresses and/or IPv4 addresses. Packet-switched network 12 may include one or more wide area networks (WANs) and/or one or more local area networks (LANs), which may be public and/or private networks.

Mobile node 14 may be a wireless device that accesses packet-switched network 12 via a wireless connection. For example, mobile node 14 could be a wireless telephone, wireless personal digital assistant (PDA), wirelessly-equipped laptop computer or other type of wireless communication device. Alternatively, mobile node 14 might access packet-switched network via a wireline connection, e.g., using a cable modem or DSL modem.

One or more network access servers (NASs), such as NAS 16 and 18, may provide mobile nodes, such as mobile node 14, access to packet-switched network 12. Mobile nodes may communicate with NAS 16 and 18 via access networks 20 and 22, respectively. Access networks 20 and 22 could be radio access networks (RANs) that communicate with mobile nodes, such as mobile node 14, via an air interface. Thus, in one example, access networks 20 and 22 might be wireless wide area networks (WWANs) that communicate with mobile nodes using an air interface format such as cdma2000, EVDO, or GSM/GPRS. In another example, access networks 20 and 22 might be wireless metropolitan area networks (WMANs) that communicate with mobile nodes using an air interface format such as IEEE 802.16 (WiMAX). In yet another example, access networks 20 and 22 might be wireless local area networks (WLANs) that communicate with mobile nodes using an air interface format such as IEEE 802.11, Bluetooth, HomeRF, or HiperLAN.

It is to be understood that access networks 20 and 22 could be different kinds of networks and may communicate with mobile nodes using different air interface formats. For example, access network 20 might be a WWAN that uses EVDO for wireless communications, and access network 22 might be a WMAN that uses IEEE 802.16 for wireless communications. In addition, one or more of access networks 20 and 22 might be wireline networks, such as DSL or data over cable networks. Moreover, although FIG. 1 shows only two NASs and two access networks, it is to be understood that network 10 may include a greater or fewer number of NASs and access networks.

NAS 16 and NAS 18 may perform various functions to support communications between mobile nodes, such as mobile node 14, and packet-switched network 12, depending on the type of access network. For example, if access network 20 is a WWAN, using cdma2000 or EVDO for wireless communications, then NAS 16 may function as a packet data serving node (PDSN). If access network 22 is a WMAN, using WiMAX for wireless communications, then NAS 18 might function as an access service network gateway (ASN-GW).

To provide network access to mobile nodes, such as mobile node 14, NAS 16 and NAS 18 may communicate with various types of network elements. For example, NAS 16 and NAS 18 may communicate with an authentication, authorization, and accounting (AAA) server 24, e.g., in order to authenticate mobile stations, authorize mobile stations for various types of service, and to report the usage of data services by mobile node for accounting purposes. For communications with AAA server 24, NAS 16 and NAS 18 may use RADIUS and RADIUS Accounting protocols. A recent version of the RADIUS protocol is described in C. Rigney et al., "Remote Authentication Dial In User Service (RADIUS)," Request for Comments 2865, June 2000, which is incorporated herein by reference. A recent version of the RADIUS Accounting protocol is described in C. Rigney, "RADIUS Accounting," Request for Comments 2866, June 2000, which is incorporated herein by reference.

Although FIG. 1 shows only one AAA server, it is to be understood that network 10 may include multiple AAA servers. For example, each mobile node may be associated with a home AAA server located in the mobile node's home network. Thus, AAA server 24 may be the home AAA server for mobile node 14. NAS 16 or 18 may send communications regarding a mobile node to the mobile node's home AAA server. However, if NAS 16 or 18 is not in the mobile node's home network, e.g., if the mobile node is roaming, then communications with the mobile node's home AAA server may be proxied via a local AAA server.

Mobile nodes, such as mobile node 14, may change their network connectivity. Thus, at one point in time, mobile node 14 may be connected to access network 20 and served by NAS 16, as shown in FIG. 1. However, at another point in time, mobile node 14 may be connected to access network 22 and served by NAS 18. For example, mobile node 14 may be handed off from access network 20 to access network 22.

To facilitate such changes in network connectivity, mobile node 14 may use Mobile IP (e.g., MIPv4 or MIPv6). In the Mobile IP approach, mobile node 14 is associated with two IP addresses: a care-of address and a home address. The care-of address may be specific to a particular access network and may change when mobile node 14 changes its network connectivity. Thus, when mobile node 14 is connected to access network 20, mobile node 14 may be allocated a care-of address by NAS 16. However, when mobile node 14 is handed off to access network 22, mobile node 14 may be allocated a different care-of address by NAS 18.

In contrast, the home address of mobile node 14 may stay the same when mobile node 14 connects to different access networks. In particular, the home address may be an IP address that is routed to a home agent 26. Moreover, home agent 26 may maintain a mobility binding for mobile node 14. The mobility binding associates the home address of mobile node 14 with the most recently reported care-of address for mobile node 14. When home agent 26 receives packets addressed to the home address of mobile node 14, home agent 26 may forward the packets to the care-of address of mobile node 14. If mobile node 14 obtains a new care-of address, e.g., as a result of a hand-off from access network 20 to access network 22, home agent 26 may be notified and may update the mobile binding for mobile node 14 with the new care-of address. In this way, packets addressed to the home address of mobile node 14 may reach mobile node 14 via home agent 26, despite changes in the network connectivity of mobile node 14.

Although FIG. 1 shows only home agent, it is to be understood that network 10 may include multiple home agents. A mobile node may be associated with a static home agent. Alternatively, a home agent may be dynamically assigned to a mobile node, for example, by the mobile node's home AAA server. AAA server 24, as the home AAA server of mobile node 14, may dynamically assign home agent 26 to mobile node 14. Thus, AAA server 24 and home agent 26 may communicate for such dynamic assignment. Home agent 26 may also communicate with AAA server 24, e.g., using RADIUS, in order to authenticate certain messages from mobile node 14.

Moreover, AAA server 24 may communicate with NAS 16 or 18 and with home agent 26 in order to function as an intermediary server for resource management, as described in more detail below. In one example, AAA server 24 may receive a notification message from NAS 16 or 18, when network connectivity with mobile node 14 is lost, and responsively send a resource management message to home agent 26, so that home agent 26 may clear its mobility binding for mobile node 14. In another example, AAA server 24 may receive a notification message from home agent 26, when mobile node 14 has updated its care-of address, and send a resource management message to NAS 16 or 18, to de-allocate the prior care-of address of mobile node 14.

3. Exemplary Operation

Figure 2:
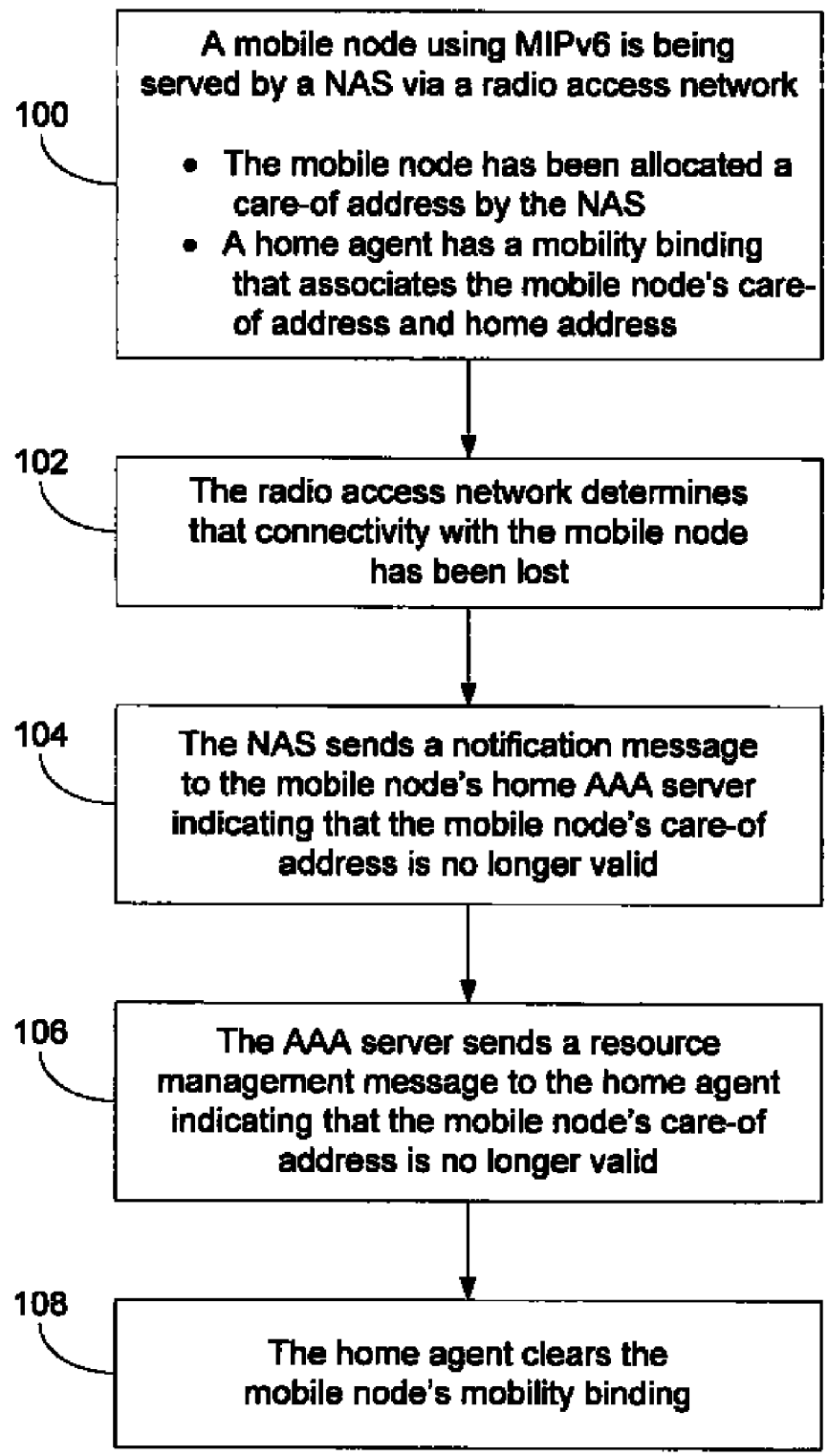
FIG. 2 is a flow chart illustrating a method of managing resources for a mobile node when a radio access network loses connectivity with the mobile node, in accordance with an exemplary embodiment of the present invention.
Figure 3:
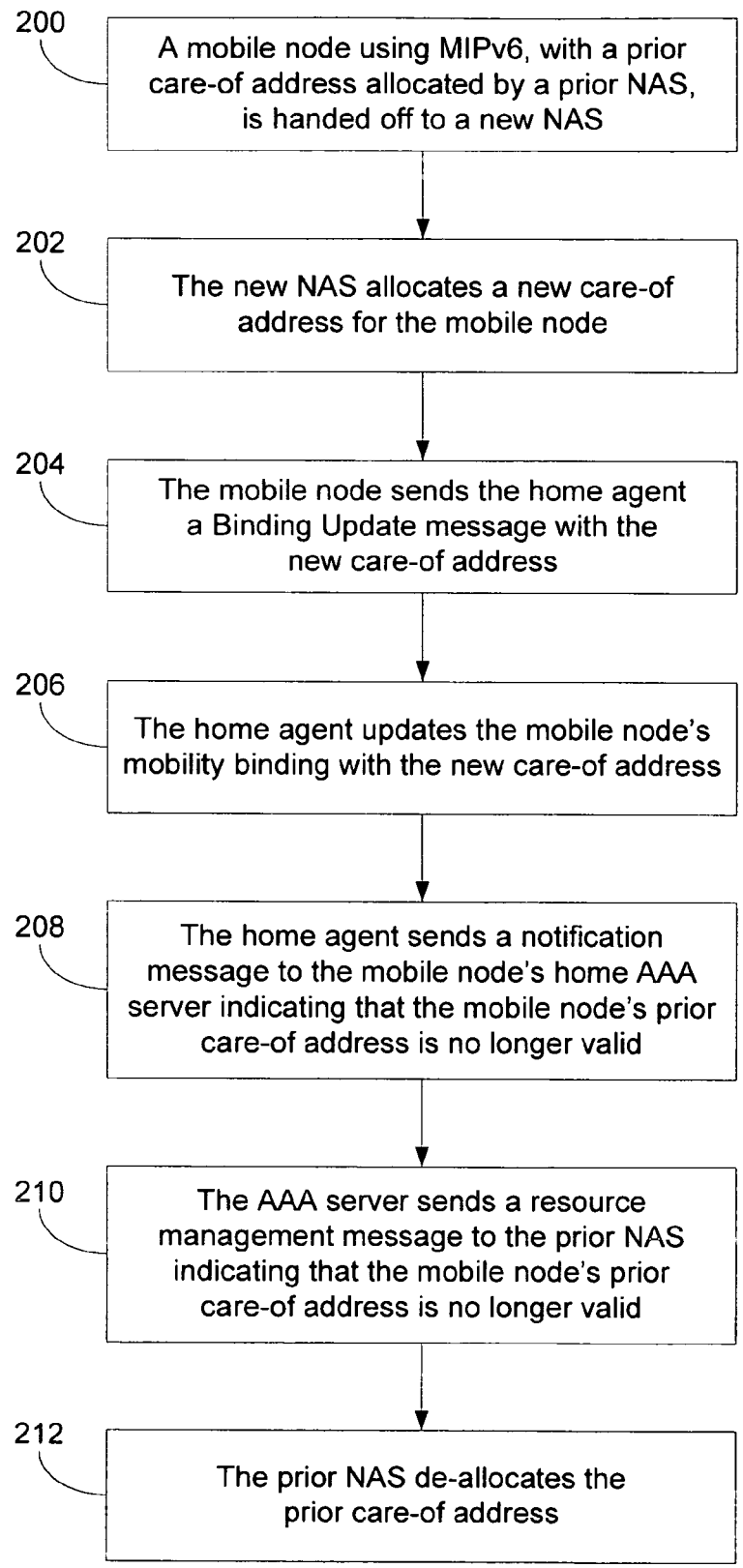
FIG. 3 is a flow chart illustrating a method of managing resources for a mobile node when the mobile node experiences a hand-off, in accordance with an exemplary embodiment of the present invention.

FIGS. 2 and 3 are flow charts illustrating exemplary methods of resource management for a mobile node, such as mobile node 14. The exemplary methods are described for the case that mobile node 14 uses MIPv6. However, it is to be understood that mobile node 14 may, alternatively, use MIPv4 or some other protocol that facilitates changes in network connectivity. The exemplary methods are also described for the case that the access networks are radio access networks. However, it is to be understood that the access networks could also be wireline networks. In addition, the home AAA server of mobile node 14 is used as the intermediary server in these exemplary procedures. However, it is to be understood that the intermediary server could be some other network element.

With reference to FIG. 2, the process may begin with a mobile node using MIPv6 being served by a NAS via a radio access network (RAN), as indicated by block 100. For example, mobile node 14 may be connected to access network 20 and served by NAS 16. At that point, the mobile node has a care-of address that has been allocated by the NAS, and a home agent has a mobility binding that associates the mobile node's care-of address and home address.

At some later point in time, the RAN determines that connectivity with the mobile node has been lost, as indicated by block 102. Connectivity may be lost, for example, because the mobile node may have been powered down or may have moved out of the RAN's wireless coverage area. The RAN may determine that connectivity is lost in various ways, depending on the protocols and policies used in the RAN. In one example, the mobile node might be expected to periodically transmit a flag to the RAN in order to indicate that the mobile node is idle but still present. If the mobile node fails to transmit the flag, then the RAN may consider connectivity with the mobile node to have been lost. In another example, the RAN may periodically page idle mobile stations and expect responses within a particular period of time. If a mobile node fails to respond, then the RAN may conclude that connectivity with the mobile node has been lost.

In response to the RAN's determination that connectivity with the mobile node has been lost, the NAS sends a notification message to the mobile node's home AAA server indicating that the mobile node's care-of address is no longer valid, as indicated by block 104. The notification message could be, for example, a RADIUS Accounting message, such as a Stop or Interim-Update message. Alternatively, the notification message might be a RADIUS User-Session-Acknowledgement message, as described in G. Zorn et al., "User Session Tracking in RADIUS," Internet Draft, Mar. 5, 2006, which is incorporated herein by reference. Other message types or protocols could be used for the notification message. The notification message may identify the mobile node, e.g., by network access identifier (NAI), and may include the care-of address, e.g., in a vendor specific attribute (VSA). For example, the Invalid-CoA VSA described below may be included in the notification message.

In response to the notification message, the mobile node's home AAA server sends a resource management message to the home agent indicating that the mobile node's care-of address is no longer valid, as indicated by block 106. In some embodiments, the mobile node's home AAA server would be aware of the mobile node's home agent because the AAA server dynamically assigned the home agent for the mobile node and/or because the mobile node's home agent queried the AAA server in order to authenticate the mobile node. In embodiments in which the AAA server does not already know the mobile node's home agent, the AAA server may be able to determine the home agent based on the mobile node's identifying information and/or by querying one or more other network elements.

The resource management message could be, for example, a RADIUS Disconnect Message or RADIUS Change-of-Authorization Message, as described in M. Chiba et al., "Dynamic Authorization Extensions to Remote Authentication Dial In User Service (RADIUS)," Request for Comments 3576, July 2003, which is incorporated herein by reference. However, other message types or protocols could be used for the resource management message. The resource management message may identify the mobile node, e.g., by NAI, and may include the mobile node's care-of address, e.g., in a VSA. For example, the Invalid-CoA VSA described below may be included in the resource management message.

In response to the resource management message, the home agent clears the mobile node's mobility binding, as indicated by block 108. The home agent may also clear other resources associated with the mobile node.

Resource management may also be performed when the mobile node experiences a hand-off, as illustrated in FIG. 3. The process may begin when a mobile node using MIPv6, with a prior care-of address allocated by a prior NAS, is handed off to a new NAS, as indicated by block 200. The new NAS allocates a new care-of address for the mobile node, as indicated by block 202. The mobile node then sends to the home agent a MIPv6 Binding Update message that includes the new care-of address, as indicated by block 204. In response, the home agent updates the mobile node's mobility binding with the new care-of address, as indicated by block 206.

In addition, the home agent sends a notification message to the mobile node's home AAA server indicating that the mobile node's prior care-of address is no longer valid, as indicated by block 208. The notification message could be, for example, a RADIUS Access-Request message, either to authenticate the Binding Update message or as a separate Access-Request message. However, other message types or protocols could be used for the notification message. The notification message may identify the mobile node, e.g., by NAI, and may include the prior care-of address and the new care-of address, for example, in the Update-CoA VSA described below.

In response to the notification message, the AAA server sends a resource management message to the prior NAS indicating that the mobile node's prior care-of address is no longer valid, as indicated by block 210. The mobile node's home AAA server would typically be aware of the prior NAS based on having previously authenticated the mobile node when served by the prior NAS. Alternatively, the AAA server may determine the prior NAS in other ways.

The resource management message could be, for example, a RADIUS Disconnect Message or RADIUS Change-of-Authorization Message. However, other message types or protocols could be used for the resource management message. The resource management message may identify the mobile node, e.g., by NAI, and may include the mobile node's prior care-of address, for example, using the Invalid-CoA VSA described below.

In response to the resource management message, the prior NAS de-allocates the prior care-of address, as indicated by block 212. The prior NAS may also clear other resources associated with the mobile node.

4. Exemplary Vendor Specific Attributes

As described above, the notification and resource management messages may include VSAs that indicate that the mobile node's care-of address is no longer valid. Two exemplary VSAs that can be used are described below. The Invalid-CoA VSA identifies the care-of address that is no longer valid. The Update-CoA VSA identifies the mobile node's prior care-of address (which is no longer valid) and identifies the mobile node's new care-of address.

As illustrated schematically in FIG. 4, an Invalid-CoA VSA may include the following fields: (1) an 8-bit Attribute Type, (2) an 8-bit Attribute Length, (3) a 32-bit Vendor ID, (4) a 8-bit Vendor-Type, (5) an 8-bit Vendor-Length, and (6) one or more subtypes, each consisting of an 8-bit Sub-Type ID, an 8-bit Sub-Type Length, and a Sub-Type Value. As illustrated schematically in FIG. 5, an Update-CoA VSA may include similar fields as an Invalid-CoA VSA but may also include a subtype that identifies a new care-of address.

The Attribute Type field includes a value that identifies the type of attribute. For example, the Attribute Type may be 26, in order to indicate a Vendor Specific Attribute in a RADIUS message. The Attribute Length field specifies the length (in octets) of the entire Vendor Specific Attribute. It is to be understood that the Attribute Type and Attribute Length fields refer to the entire Vendor Specific Attribute, which may include one or more instances of specific subattributes.

The Vendor-ID field includes a value that identifies the "vendor" corresponding to the VSA. For example, the Vendor-ID may be 5535, in order to identify 3GPP2 as the vendor. The Vendor-Type field includes a value that identifies a particular type of attribute for the identified vendor. Thus, a vendor may specify one Vendor-Type value to indicate an Invalid-CoA VSA and a different Vendor-Type value to indicate an Update-CoA VSA. The Vendor-Length is the length (in octets) of the attribute corresponding to the identified Vendor-Type.

The Invalid-CoA and Update-CoA VSAs may include multiple subtypes, with each subtype including a Sub-Type ID, Sub-Type Length, and Sub-Type Value. The Sub-Type ID field contains a value that identifies the particular subtype. In the examples described herein, the Sub-Type ID is 1, 2, or 3. However, other subtypes could also be specified. The Sub-Type Length specifies the length (in octets) of the Sub-Type Value. The Sub-Type Value depends on the subtype.

In an Invalid-CoA VSA, a Sub-Type ID=1 subtype may be used to identify the care-of address that is no longer valid. Thus, for this subtype, the Sub-Type Value field contains the care-of address and the Sub-Type Length specifies the length in octets of the care-of address. For an IPv6 care-of address, the Sub-Type Length would be 18.

An Invalid-CoA VSA may also contain a Sub-Type ID=2 subtype to hold a correlation ID that is used to correlate multiple records for a given data session, e.g., for accounting purposes. Thus, for this subtype, the Sub-Type Value field contains a correlation ID. The length of the correlation ID may be 8 octets, as specified in the Sub-Type Length field.

In an Update-CoA VSA, a Sub-Type ID=1 subtype may be used to identify the mobile node's new IPv6 care-of address. Thus, for this subtype, the Sub-Type Value field contains the new care-of address and the Sub-Type Length specifies the length in octets of the new care-of address (e.g., 18 octets for an IPv6 address).

An Update-CoA VSA may also contain a Sub-Type ID=2 subtype to hold a correlation ID that is used to correlate multiple records. Thus, for this subtype, the Sub-Type Value field contains a correlation ID, and the Sub-Type Length field specifies the length of the correlation ID (e.g., 8 octets).

In addition, an Update-CoA VSA may contain a Sub-Type ID=3 subtype to identify the mobile node's prior IPv6 care-of address, i.e., the care-of address that is no longer valid. Thus, for this subtype, the Sub-Type Value field contains the prior care-of address and the Sub-Type Length specifies the length in octets of the prior care-of address (e.g., 18 octets for an IPv6 address).

It is to be understood that these Invalid-CoA and Update-CoA VSAs are exemplary only. VSAs in other formats could be included in RADIUS messages to indicate that a mobile node's care-of address is no longer valid and/or to indicate a new care-of address for the mobile node. In addition, messages using protocols other than RADIUS may be used, and such messages may indicate that a mobile node's care-of address is no longer valid in other ways.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of resource management for a mobile node, wherein said mobile node has been allocated a care-of address by a network access server (NAS) and a home agent has a mobility binding for said mobile node that associates said care-of address with a home address of said mobile node, said method comprising:
   after said mobile node powers down, an intermediary server receiving a first message from said NAS, said first message indicating that said care-of address is no longer valid for said mobile node;
   in response to said first message, said intermediary server sending a second message to said home agent, said second message indicating that said care-of address is no longer valid for said mobile node; and
   in response to said second message, said home agent clearing its mobility binding for said mobile node.

2. The method of claim 1, wherein said intermediary server is an authentication, authorization and accounting (AAA) server and said first and second messages are Remote Authentication Dial In User Service (RADIUS) messages.

3. The method of claim 1, further comprising:
   said NAS serving said mobile node via a radio access network (RAN) before said mobile node powers down.

4. The method of claim 3, wherein said NAS is a packet data serving node (PDSN).

5. The method of claim 3, further comprising:
   said RAN making a determination that connectivity with said mobile node has been lost; and
   in response to said determination, said NAS responsively sending said first message to said intermediary server.

6. The method of claim 1, wherein said care-of address is an IPv6 address.

7. A method of resource management for a mobile node, said mobile node having a home address that routes to a home agent, said method comprising:
   a network access server (NAS) allocating a care-of address to said mobile node, wherein said NAS serves said mobile node via a radio access network (RAN);
   associating said home address with said care-of address in a mobility binding at said home agent;
   after said NAS has allocated said care-of address to said mobile node, said RAN making a determination that connectivity with said mobile node has been lost;
   in response to said determination, said NAS sending a notification message to an intermediary server, said notification message indicating that said care-of address is no longer valid;
   in response to said notification message, said intermediary server sending a resource management message to said home agent, said resource management message indicating that said care-of address is no longer valid; and
   in response to said resource management message, said home agent clearing said mobility binding.

8. The method of claim 7, wherein said intermediary server is an authentication, authorization, and accounting (AAA) server.

9. The method of claim 8, wherein said notification message is a RADIUS Accounting STOP message and said resource management message is a RADIUS Disconnect-Request message.

* * * * *